(12) United States Patent
Pandya et al.

(10) Patent No.: US 9,075,855 B2
(45) Date of Patent: Jul. 7, 2015

(54) TABLE SYNTHESIS FROM RAW DATA

(75) Inventors: Hemal Pandya, Pune Mah (IN);
Ityshree Hingle, Nagpur Mah (IN)

(73) Assignee: SYBASE, INC., Dublin, CA (US)

( * ) Notice: Subject to any disclaimer, the term of this patent is extended or adjusted under 35 U.S.C. 154(b) by 1513 days.

(21) Appl. No.: 11/638,412

(22) Filed: Dec. 14, 2006

(65) Prior Publication Data

US 2008/0147712 A1    Jun. 19, 2008

(51) Int. Cl.
*G06F 7/00*     (2006.01)
*G06F 17/30*    (2006.01)

(52) U.S. Cl.
CPC ............... *G06F 17/30569* (2013.01)

(58) Field of Classification Search
CPC ................ G06F 17/245; G06F 17/246
USPC ........................................... 707/791
See application file for complete search history.

(56) References Cited

U.S. PATENT DOCUMENTS

| | | | | |
|---|---|---|---|---|
| 5,594,898 | A * | 1/1997 | Dalal et al. | 707/696 |
| 6,088,708 | A * | 7/2000 | Burch et al. | 715/229 |
| 6,639,611 | B1 * | 10/2003 | Leduc | 715/764 |
| 6,675,351 | B1 * | 1/2004 | Leduc | 715/264 |
| 7,117,435 | B1 * | 10/2006 | Kotler et al. | 715/210 |
| 7,299,406 | B2 * | 11/2007 | Schnurr | 715/212 |
| 7,337,163 | B1 * | 2/2008 | Srinivasan et al. | 1/1 |
| 7,412,645 | B2 * | 8/2008 | Kotler et al. | 715/212 |
| 7,725,434 | B2 * | 5/2010 | Boggs | 707/613 |
| 7,792,847 | B2 * | 9/2010 | Dickerman et al. | 707/756 |
| 2002/0120630 | A1 * | 8/2002 | Christianson et al. | 707/103 R |
| 2004/0107205 | A1 * | 6/2004 | Burdick et al. | 707/102 |
| 2005/0102314 | A1 * | 5/2005 | Howard et al. | 707/102 |
| 2005/0210053 | A1 * | 9/2005 | Focazio et al. | 707/101 |
| 2005/0262120 | A1 * | 11/2005 | Shoup et al. | 707/100 |

\* cited by examiner

*Primary Examiner* — Binh V Ho

(74) *Attorney, Agent, or Firm* — Sterne Kessler Goldstein & Fox P.L.L.C.

(57) ABSTRACT

A system, method, and computer program product for organizing a visual representation of data into a structured data format are presented. Steps for identifying cell data structures from raw data and creating a structured data format are disclosed.

23 Claims, 7 Drawing Sheets

BEFORE

600

| | 2006 | 2006 | 2006 | 2006 |
|---|---|---|---|---|
| Quarter | Q1 | Q2 | Q3 | Q4 |

AFTER

602

604

| { filler } | 2006 | 2006 | 2006 | 2006 |
|---|---|---|---|---|
| Quarter | Q1 | Q2 | Q3 | Q4 |

FIG. 6

TABLE SYNTHESIS FROM RAW DATA

BACKGROUND OF INVENTION

1. Field of the Invention

The present invention relates generally to data processing and, more particularly, to data processing of visual representations of data.

2. Description of the Background Art

Generating visual representations of data stored in a structured data format is well known in the art. Creating a structured data format representation of data from a visual representation of the data is far more complicated.

Given the many ways in which data may be shown in a visual representation, there exists in the art no straightforward way of obtaining an accurate structured data format representation of the data gathered from the visual representation. Accordingly, what is desired is a heuristic for synthesizing a structured data format from a visual representation of data.

SUMMARY OF INVENTION

The invention includes a computer-implemented method for organizing raw data in a structured data format. The method includes the steps of identifying a plurality of cell data structures in the raw data, identifying neighbors of the plurality of cell data structures, and creating the structured data format, wherein the structured data format comprises one or more of the plurality of cell data structures. Each of the cell data structures in the structured data format is a neighbor of at least one of the cell data structures in the structured data format, in accordance with an embodiment of the present invention.

The invention further includes a computer program product comprising a computer usable medium having computer program logic recorded thereon for enabling a processor to organize raw data in a structured data format. The computer program logic includes a first identifying means for enabling a processor to identify a plurality of cell data structures in the raw data, a second identifying means for enabling a processor to identify neighbors of the plurality of cell data structures, and a creating means for enabling a processor to create the structured data format. The structured data format comprises one or more of the plurality of cell data structures, where each of the cell data structures in the structured data format is a neighbor of at least one of the cell data structures in the structured data format, in accordance with an embodiment of the present invention.

The invention additionally includes a system capable of organizing raw data in a structured data format. The system includes a first module for identifying a plurality of cell data structures in the raw data, a second module for identifying neighbors of the plurality of cell data structures, and a third module for creating the structured data format, wherein the structured data format comprises one or more of the plurality of cell data structures. Each of the cell data structures in the structured data format is a neighbor of at least one of the cell data structures in the structured data format, in accordance with an embodiment of the present invention.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the relevant art to make and use the invention.

FIG. 6 illustrates the creation of a filler cell, in accordance with an embodiment of the present invention.

Figure 1:
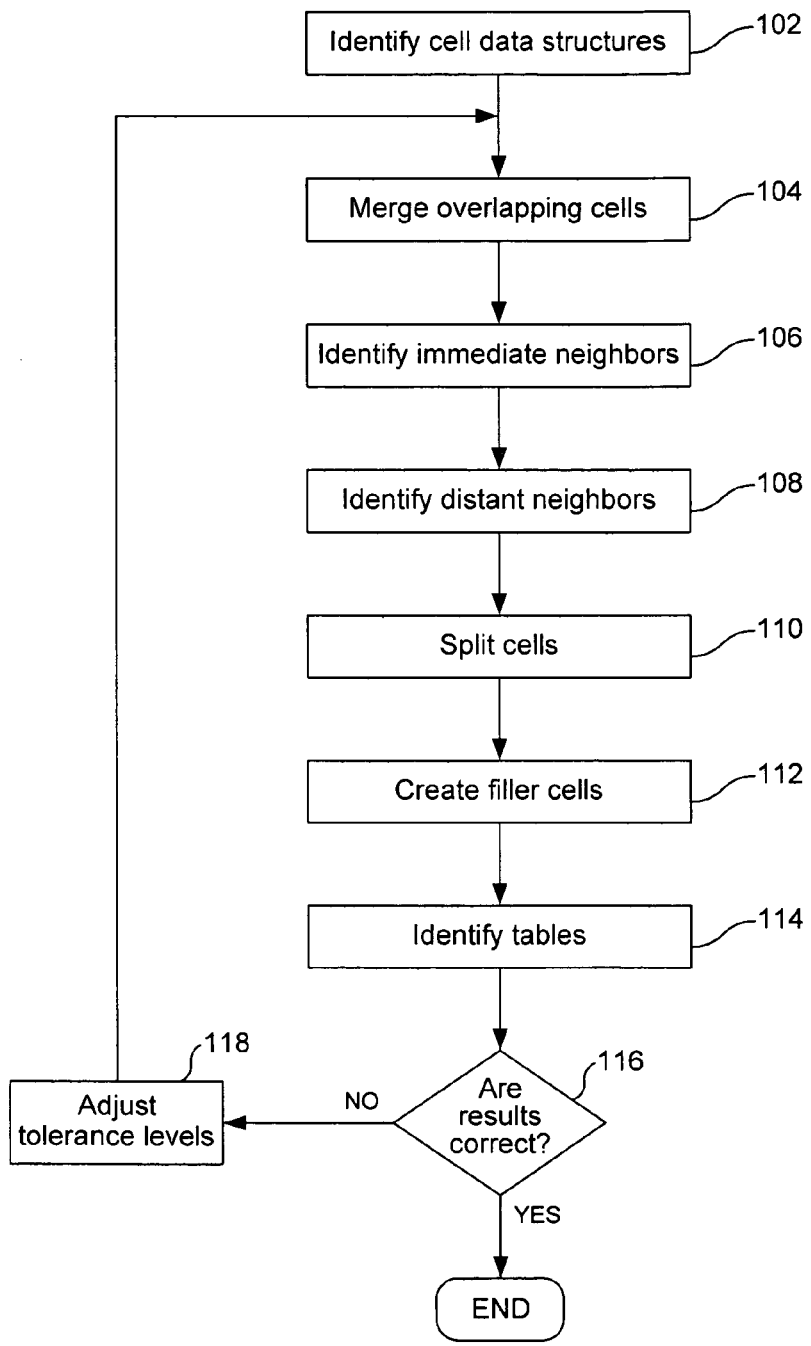
FIG. 1 is a flow chart illustrating a method by which raw data is stored in a structured data format, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

1. Introduction

Data presented in a visual manner for interpretation by a human user is often not in a format that is easily interpreted by a computer. Generating human-understandable visual representations of data contained in a structured format is usually a straightforward process. However, the converse is not usually true. The invention addresses this limitation in the art. Specifically, by performing a series of heuristic algorithms, data can be obtained from a visual representation in order to generate a data structure.

In accordance with an embodiment of the present invention, such heuristic algorithms are implemented in a system designed to interface with applications that may produce structured data representations and visual data representations with the eventual goal of formatting the structured data representations in a new visual format. In accordance with a further embodiment of the present invention, the system is designed to gather data from structured data representations and visual data representations for translation to formats readable on a hand-held device. It is noted that the invention is not limited to hand-held devices, and is instead applicable to all types of data processing devices.

2. Table Synthesis Process

Data presented in a visual manner may be readable by a system implementing the aforementioned heuristic algorithms. The heuristic algorithms are implemented differently according to the specific visual presentation format of the data being read and processed. In accordance with an embodiment of the present invention, data is presented visually using HTML coding to generate tables. The physical visual characteristics of the table can be determined by proper interpretation of the HTML code used to generate the table. For illustrative purposes, examples disclosed herein will assume that visual representations of the data are generated using HTML. A person skilled in the relevant art will appreciate that the data may be visually represented in other formats that could similarly be used.

FIG. 1 depicts a flowchart 100 of an exemplary operation of a series of heuristic algorithms used to generate a structured data format, such as a grid, from data contained in tables, in accordance with an embodiment of the present invention. FIG. 1 is described with reference to FIGS. 2-6.

At step 102, individual cell data structures are identified by analyzing a visual representation of data, such as a table. A cell is the basic unit of a table which contains data. In accordance with an embodiment of the present invention, in an example HTML implementation of a table, this data would be enclosed, for example, within a set of <td> tags. Accordingly, identification of the cells is accomplished by locating each matching set of <td> tags and holding the data enclosed within the tags in a data structure, in accordance with an embodiment of the present invention. In accordance with a further embodiment of the present invention, identification of the cells is accomplished by determining the coordinates of a visual representation of a geometric object containing data on the screen. Other methods for identifying individual cells will be apparent to persons skilled in the relevant arts, as the data need not be laid out explicitly using HTML table tags.

The remaining steps in flowchart 100 are directed to proper interpretation of the cells identified in step 102 as part of a common grid, and establishing the relationships between the cells.

3. Interpreting Identified Cells

Figure 2:
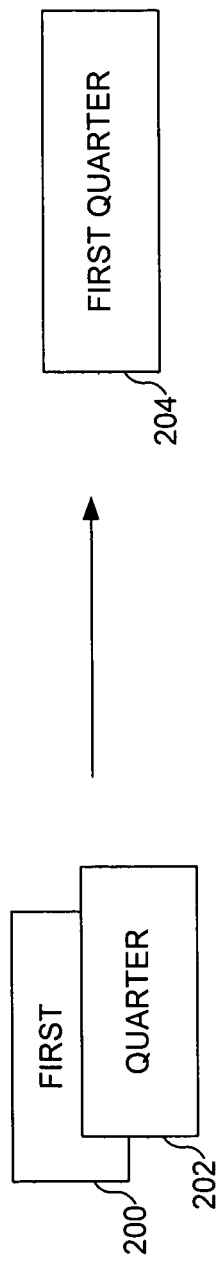
FIG. 2 illustrates merging of two overlapping cells, in accordance with an embodiment of the present invention.

At step 104 in FIG. 1, any cells that are overlapping are merged into a single cell. FIG. 2 illustrates an example of the merging of two overlapping cells, 200 and 202, into a single cell 204, in accordance with an embodiment of the present invention. In accordance with an embodiment of the present invention, determination of whether two cells overlap is made by determining whether any portion of the rectangles enclosing each of the two cells overlap with each other.

Figure 3:
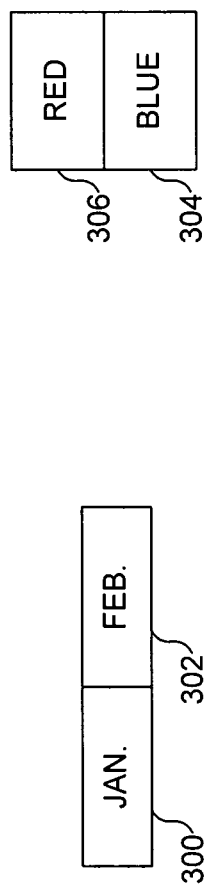
FIG. 3 illustrates identification of immediate neighbor cells, in accordance with an embodiment of the present invention.

At step 106, cells that are immediate neighbors of each other are identified. FIG. 3 illustrates example cells with a single adjacent neighbor, in accordance with an embodiment of the present invention. In performing step 106, each of the cells 300, 302, 304, and 306 is analyzed for any immediate neighbor cells, i.e., those which share a common edge along any of the four edges of the cell. When cell 300 is considered, cell 302 will be identified as its neighbor. Similarly, when cell 302 is considered, cell 300 will be identified as its neighbor. Cell 300 and 302 are immediate horizontal neighbors, and a notation is made in the generated structured data format. Similarly, cells 304 and 306 share a side and are immediate vertical neighbors. A notation is made in the generated structured data format to this effect. In accordance with an embodiment of the present invention, the aforementioned notations are made by keeping a list within each identified cell of that cell's neighbors. Other methods for tracking a cell's neighbors will be apparent to persons skilled in the relevant arts, and accordingly the invention is not limited to the examples described herein.

Figure 4:
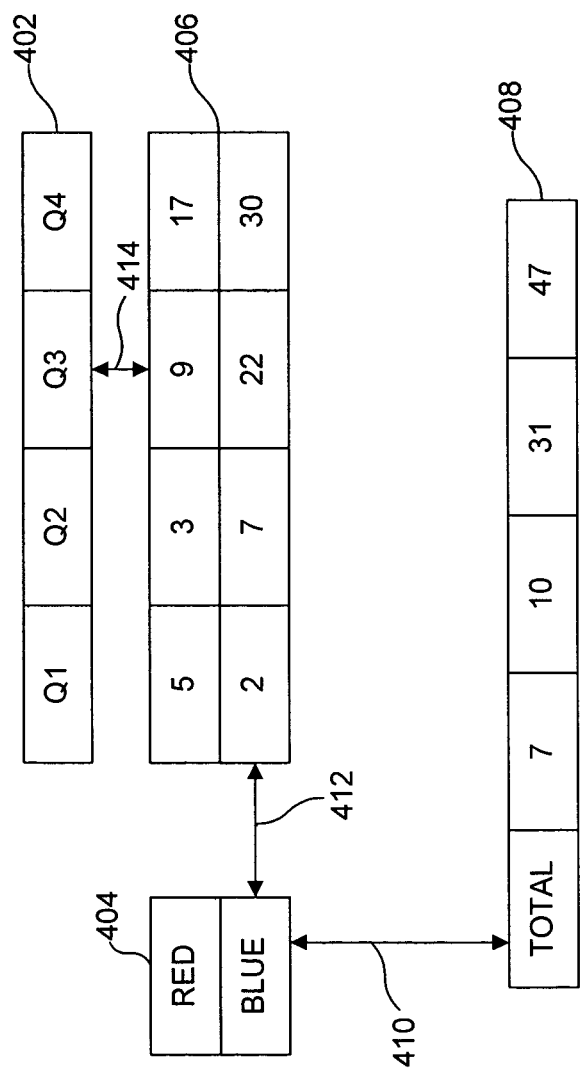
FIG. 4 illustrates identification of distant neighbor cells, in accordance with an embodiment of the present invention.

At step 108, distant neighbors are identified. Distant neighbors are those which do not share a common edge, but are in any case considered neighbors for data interpretation purposes, in accordance with an embodiment of the present invention. FIG. 4 illustrates an example table 400 which contains cells that do not share a common edge, in accordance with an embodiment of the present invention. In performing step 108, each of the cells is analyzed for distant neighbor cells. For example, each of the cells in row 402 is separated from a group of cells 406 by a distance 414. Similarly, cell column 404 is separated from the group of cells 406 by a distance 412. Cell row 408 is separated from cells 404 and 406 by a distance 410.

A notation is made in the generated structured data format whenever distant neighbors are identified in step 108 in a similar manner as with immediate neighbors in step 106. Cells are identified as neighbors of each other in step 108 when the distance between them is less than the distance specified by a tolerance, in accordance with an embodiment of the present invention. In accordance with a further embodiment of the present invention, cells are identified as neighbors of each other in step 108 when the distance between them is less than or equal to the distance specified by a tolerance. A detailed discussion of tolerances is provided in Section 4. There are a number of approaches for comparing the distances between cells with tolerances, and such approaches will be apparent to persons skilled in the relevant arts.

In the example of table 400, assume that distance 410 is the largest distance, distance 414 is the smallest distance, and distance 412 is larger than distance 414 but smaller than distance 410. In an example in which a tolerance was specified as equal to the distance 412, and in which distant neighbors were identified as cells separated by a distance less than or equal to the tolerance, then cells 404 would be considered neighbors with the closest cells of cell group 406. Specifically, the cell containing "Red" from the group of cells 404 would be considered a neighbor of the cell containing "5" from cells 406, and vice versa. The cell containing "Blue" from cells 404 would be considered a neighbor of the cell containing "2" from cells 406. Similarly, each of the cells in row 402 would be considered neighbors of the corresponding cells of cell group 406 because distance 414 is less than the tolerance distance. Specifically, the cell containing "Q1" from group 402 would be considered a neighbor of the cell containing "5" from cells 406, and vice versa. The same would apply to the cells containing "Q2", "Q3", and "Q4" from cells 402 and the cells containing "3", "9", and "17" from cells 406, respectively. In the example, the cells in row 408 would not be considered neighbors with any of the cells in group 404 or the cells in group 406 because distance 410 is greater than the tolerance.

Figure 5:
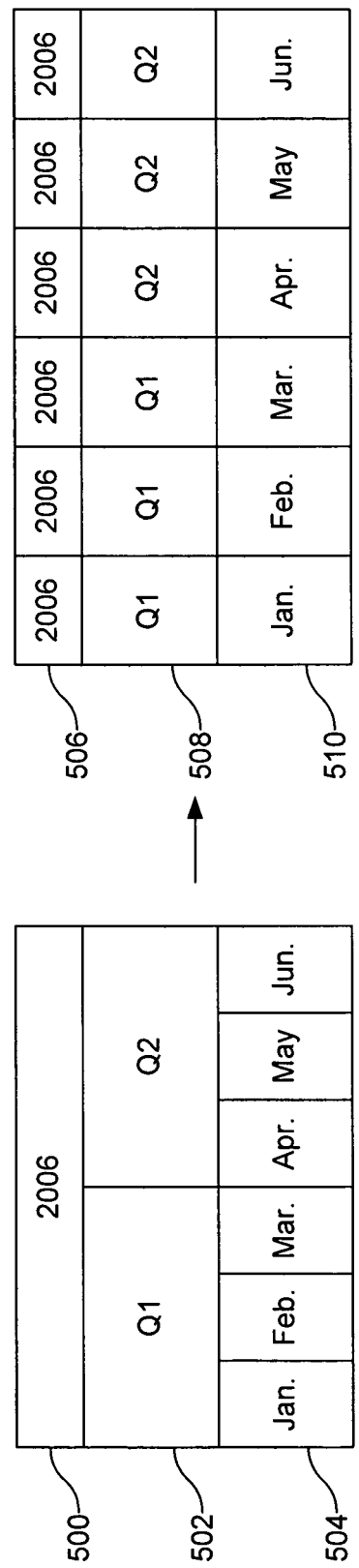
FIG. 5 illustrates splitting of cells, in accordance with an embodiment of the present invention.

At step 110 in flowchart 100, any cells that span more than one column or row are split, and the information within them is duplicated. For automated processing, it is typically desired that there be the same number of rows in each column, and the same number of columns in each row. FIG. 5 illustrates an example of how cells are split pursuant to step 110, in accordance with an embodiment of the present invention. A table originally consisting of a row 500 containing year data, a row 502 containing quarter data, and a row 504 containing month data is formed by three rows and six columns. Row 504 contains a cell in each of the six columns, but row 502 only contains two cells, each spanning three columns. Row 500 contains a single cell spanning all six columns. A table consisting of rows 506, 508, and 510 is also shown in FIG. 5 as the result of splitting the cells from rows 500, 502, and 504. Row 504 originally contained one cell for each of the six columns, so resulting row 510 illustrates that it was unnecessary to create additional cells in that row. The two cells in row 502 are each split to form the new row 508, each cell from row 502 now shown as three separate cells in row 508 containing a copy of the data from their original cell. Similarly, the single cell in row 500 spanning all six columns is formed by six individual cells in row 506, each containing a copy of the data in the original cell. One skilled in the relevant art will appreciate that a similar technique can be employed for splitting cells spanning multiple rows, or spanning both multiple rows and multiple columns.

At step 112 in flowchart 100, filler cells may be created. Filler cells are used whenever there is a gap in a table, such gaps typically occurring whenever row or column headings are used in a table. FIG. 6 illustrates an example table 600 containing a gap, and a resulting example table 602 in which a filler cell 604 is created to normalize the table, in accordance with an embodiment of the present invention. Prior to the creation of filler cell 604, the column of filler cell 604 contained one less row than the remainder of the table, and the row of filler cell 604 contained one less column than the remainder of the table. Referring to table 600, prior to the addition of filler cell 604, the top row has cells spanning four columns whereas the bottom row has cells spanning five columns. The first column, prior to the addition of filler cell 604, only has one cell in one row, whereas the second through fifth columns each has two rows. Therefore, in order to facilitate processing, the table 600 is normalized in order to create a consistent number of cells in each column and row throughout the table as in table 602, in accordance with an embodiment of the present invention. In accordance with a further embodiment of the present invention, filler cells are designated as neighbors of the cells in the immediately adjacent columns and/or rows.

At step 114 in flow chart 100, tables are identified in the data being processed based on the above-described processing. In accordance with an embodiment of the present invention, tables are defined as a collection of cells where each cell in the collection is the neighbor of at least one other cell in the collection. After steps 104 through 112 of flowchart 100 are performed, several such collections of cells may be established, and each such collection is interpreted as a different table. Referring again to FIG. 4, in an example where tolerances for identifying distant neighbors in step 108 are set to a distance equivalent to distance 412, where distance 414 is smaller than distance 412, which in turn is smaller than distance 410, none of the cells in group of cells 408 would be a neighbor of any of the cells in group of cells 406 or 404. Accordingly, in this example, cells 404, 406, and 402 would be identified as part of the same table in step 114, and cells 408 would be identified as a separate table in step 114, in accordance with an embodiment of the present invention. After performing the steps in flowchart 100, all raw data is stored in a structured data format, such as a grid, in accordance with an embodiment of the present invention, allowing for data processing.

One skilled in the relevant art will appreciate that the order of execution of steps 104 through 114 need not be as presented above or as shown in FIG. 1. Furthermore, it is not necessary that all steps 104 through 114 be performed in order to obtain sufficient data to store in a structured data format in order to allow for further data processing.

4. Tolerances

After tables are identified in step 114 of flow chart 100, a visual representation of the tables is reconstructed from a structured data format representation created from the performance of steps 104 through 114. This visual representation is presented to a user at step 116, and the user is asked to confirm whether the new visual representation conforms to the original visual representation. If the user agrees with the automated determination, then the data stored in the structured data format representation is assumed to be an adequate representation of the original visual representation and is ready for data processing.

If the user believes that the automated determination did not result in an appropriate visual representation of the data, then the user indicates that the tables presented at step 116 are not correct. At step 118 of flow chart 100, the user is presented with an opportunity to adjust the tolerance levels used in identifying distant neighbors in step 108. When the tolerance levels are adjusted, the process of interpreting the data cells is repeated, starting at step 104, using the new tolerance values.

One skilled in the relevant art will further appreciate that if a user indicates that the results in step 116 are not correct, then after step 118 is performed, it may only be necessary to subsequently perform steps 108 through 114 in each additional iteration.

In accordance with an embodiment of the present invention, the tolerance values used in step 108 may be specified separately for horizontal distances and vertical distances between cells. In accordance with a further embodiment of the present invention, the tolerance values may be specified as a fixed amount (usually in pixels) or as a relative amount.

If the tolerance is specified as a fixed amount, cells separated by a distance less than the specified amount are designated as neighbors, in accordance with an embodiment of the present invention. If the tolerance is specified as a relative amount, cells that are horizontally separated by a certain distance will be considered neighbors if that distance is less than some factor of the current cell's width, in accordance with an embodiment of the present invention. In accordance with a further embodiment of the present invention, if the tolerance is specified as a relative amount, cells that are vertically separated by a certain distance will be considered neighbors if that distance is shorter than some factor of the current cell's height. One skilled in the relevant art will appreciate that when considering relative distances, it is possible to determine the height and width of both cells for which a neighbor property is being determined, and to use a consistent property of the two cells in the relative calculation. In accordance with an embodiment of the present invention, the larger of width or height of the two cells is used in relative calculations.

When step 108 is first performed, a default set of tolerances is used, and a user is allowed to specify new tolerances at step 118 if the results presented in step 116 are not correct, in accordance with an embodiment of the present invention. In accordance with an additional embodiment of the present invention, the user may choose to specify tolerances prior to the first execution of step 108.

5. Applications

Many applications provide useful data only in a visual representation of the data. A system designed to function with that data would need to convert the data into a useful format using the aforementioned methods in order to process the data.

In accordance with an embodiment of the present invention, a back-end application provides a visual representation of a set of data. The aforementioned methods are performed by an intermediary system which retrieves the data from the visual representation into a structured data format. The data in the structured data format can then be transmitted in a format useful to a variety of different devices. In accordance with an embodiment of the present invention, the data in the structured data format is transmitted to a mobile device. Data in the structured data format may be further manipulated in order to present it on a target device.

In accordance with a further embodiment of the present invention, an application performing the aforementioned methods is used to obtain data from a number of visual representations of data, and a statistical analysis of the structured data is performed.

One skilled in the relevant art will appreciate that a number of different applications exist, as practicing the aforementioned invention allows the conversion of data in a visual representation into any target data format.

6. Example Computer System Implementation

Figure 7:
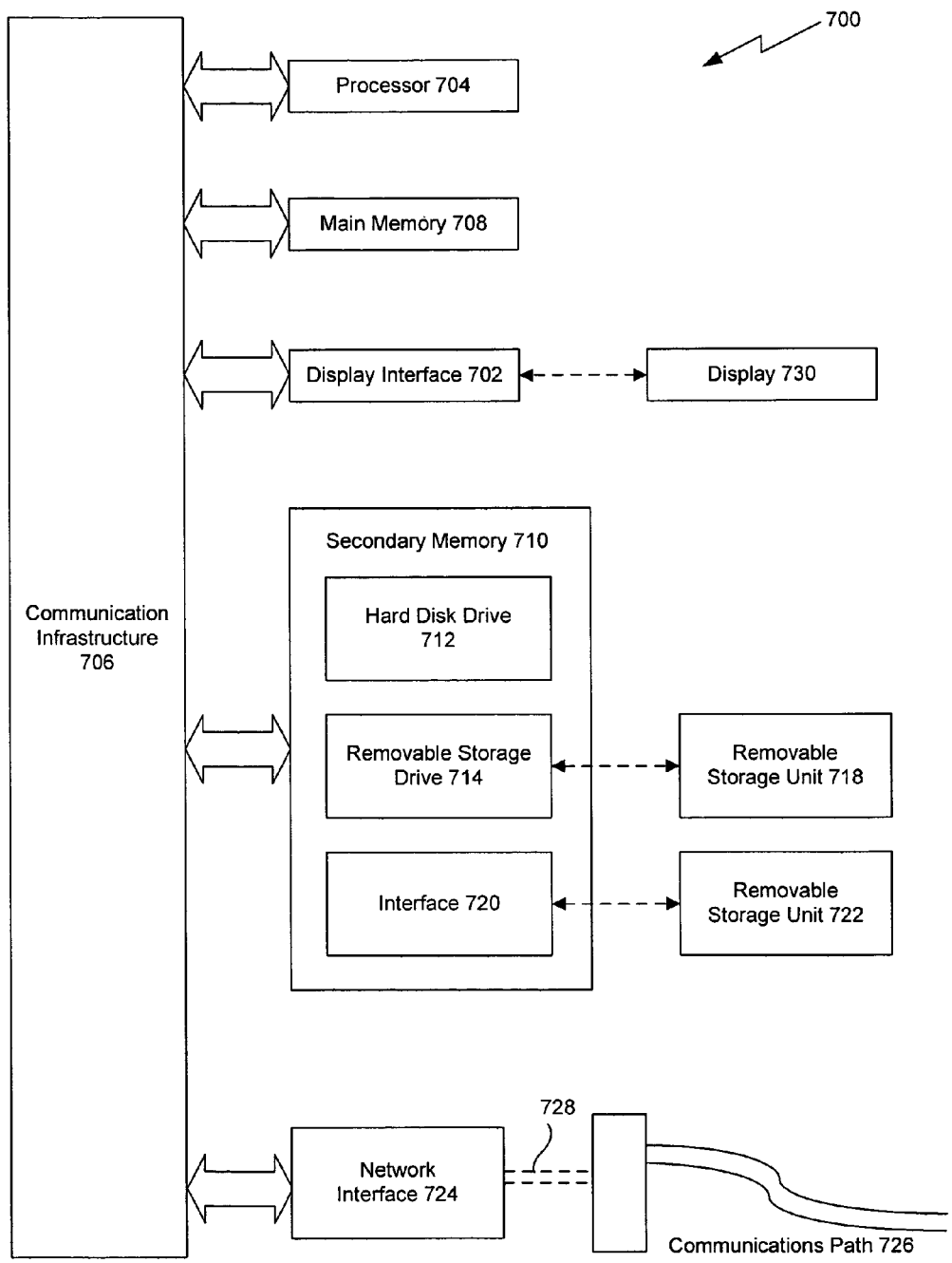
FIG. 7 depicts an example computer system in which the present invention may be implemented.

Various aspects of the present invention can be implemented by software, firmware, hardware, or a combination thereof. FIG. 7 illustrates an example computer system 700 in which the present invention, or portions thereof, can be implemented as computer-readable code. For example, the method illustrated by flowchart 100 of FIG. 1 can be implemented in system 700. Various embodiments of the invention are described in terms of this example computer system 700. After reading this description, it will become apparent to a person skilled in the relevant art how to implement the invention using other computer systems and/or computer architectures.

Computer system 700 includes one or more processors, such as processor 704. Processor 704 can be a special purpose or a general purpose processor. Processor 704 is connected to a communication infrastructure 706 (for example, a bus or network).

Computer system 700 also includes a main memory 708, preferably random access memory (RAM), and may also include a secondary memory 710. Secondary memory 710 may include, for example, a hard disk drive 712, a removable storage drive 714, and/or a memory stick. Removable storage drive 714 may comprise a floppy disk drive, a magnetic tape drive, an optical disk drive, a flash memory, or the like. The removable storage drive 714 reads from and/or writes to a removable storage unit 718 in a well known manner. Removable storage unit 718 may comprise a floppy disk, magnetic tape, optical disk, etc. which is read by and written to by removable storage drive 714. As will be appreciated by persons skilled in the relevant art(s), removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 are in the form of signals which may be electronic, electromagnetic, optical, or other signals capable of being received by communications interface 724. These signals are provided to communications interface 724 via a communications path 726. Communications path 726 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 718, removable storage unit 722, a hard disk installed in hard disk drive 712, and signals carried over communications path 726. Computer program medium and computer usable medium can also refer to memories, such as main memory 708 and secondary memory 710, which can be memory semiconductors (e.g. DRAMs, etc.). These computer program products are means for providing software to computer system 700.

Computer programs (also called computer control logic) are stored in main memory 708 and/or secondary memory 710. Computer programs may also be received via communications interface 724. Such computer programs, when executed, enable computer system 700 to implement the present invention as discussed herein. In particular, the computer programs, when executed, enable processor 704 to implement the processes of the present invention, such as the steps in the method illustrated by flowchart 100 of FIG. 1 discussed above. Accordingly, such computer programs represent controllers of the computer system 700. Where the invention is implemented using software, the software may be stored in a computer program product and loaded into computer system 700 using removable storage drive 714, interface 720, hard drive 712 or communications interface 724.

The invention is also directed to computer products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage device, etc.), and communication mediums (e.g., wired and wireless communications networks, local area networks, wide area networks, intranets, etc.).

7. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computer-implemented method comprising:
identifying, within a visual representation of data, a first cell data structure and a second cell data structure;
determining, within the visual representation, that the second cell data structure is a neighbor of the first cell data structure based on a distance between the first cell data structure and the second cell data structure being within a tolerance level, wherein determining that the second cell data structure is a neighbor of the first cell data structure indicates a structural relationship between the first and the second cell data structures; and assembling data from the first and the second cell data structures into a structured data format that tracks the structural relationship, wherein the structural relationship is available to a data processing algorithm.

2. The method of claim 1, wherein the identifying comprises:
   locating the first and second cell data structures in a scripting language; and
   verifying data contained within the located first and second cell data structures as belonging to the first and the second cell data structures.

3. The method of claim 1, further comprising:
   identifying a plurality of overlapping cell data structures in the visual representation; and
   merging data from the overlapping cell data structures into a single element of the structured data format.

4. The method of claim 1, wherein the determining comprises:
   determining the second cell data structure is an immediate neighbor based on whether the second cell data structure shares a common edge with the first cell data structure.

5. The method of claim 1, wherein the tolerance level comprises a tolerance value, and the determining comprises:
   determining the second cell data structure is a distant neighbor based on whether the distance is less than the tolerance value.

6. The method of claim 5, wherein the tolerance value is specified as an absolute distance measurement.

7. The method of claim 5, wherein the tolerance value is specified relative to a measurement of the first cell data structure and the second data structure.

8. The method of claim 5, further comprising:
   generating a structured visual representation of the structured data format;
   presenting the structured visual representation to a user;
   prompting the user to indicate whether the structured visual representation adequately conforms with the visual representation; and
   if the user indicates that the visual representation does not adequately conform, then
      receiving a new tolerance value from the user; and
      repeating the steps of determining the neighbor, assembling data from the cell data structure and the neighbor into the structured data format, generating the structured visual representation, presenting the structured visual representation, and prompting the user.

9. The method of claim 1, further comprising:
   splitting the first cell data structure into multiple cells containing the same data as the first cell data structure, wherein the first cell data structure is split if it occupies more than one column or row.

10. The method of claim 1, further comprising:
    creating one or more filler cell data structures.

11. The method of claim 1, further comprising:
    generating a structured visual representation of the structured data format;
    presenting the structured visual representation to a user; and
    prompting the user to indicate whether the structured visual representation adequately conforms with the visual representation.

12. A non transitory computer usable medium having recorded thereon computer-executable instructions that, responsive to execution by a computing device, cause the computing device to perform operations comprising:
    identifying, within a visual representation of data, a first cell data structure and a second cell data structure;
    determining, within the visual representation, that the second cell data structure is a neighbor of the first cell data structure based on a distance between the first cell data structure and the second cell data structure being within a tolerance level, wherein determining that the second cell data structure is a neighbor of the first cell data structure indicates a structural relationship between the first and the second cell data structures; and
    assembling data from the first and the second cell data structures into a structured data format that tracks the structural relationship, wherein the structural relationship is available to a data processing algorithm.

13. The non-transitory computer usable medium of claim 12, wherein the identifying comprises:
    locating the first and second cell data structures in a scripting language; and verifying data contained within the located first and second cell data structures as belonging to the first and the second cell data structures.

14. The non-transitory computer usable medium of claim 12, the operations further comprising:
    identifying a plurality of overlapping cell data structures in the visual representation; and
    merging data from the overlapping cell data structures into a single element of the structured data format.

15. The non-transitory computer usable medium of claim 12, wherein the determining comprises:
    determining the second cell data structure is an immediate neighbor based on whether the second cell data structure shares a common edge with the first cell data structure.

16. The non-transitory computer usable medium of claim 12, wherein the tolerance level comprises a tolerance value, and the determining comprises:
    determining the second cell data structure is a distant neighbor based on whether the distance is less than the tolerance value.

17. The non-transitory computer usable medium of claim 16, wherein the tolerance value is specified as an absolute distance measurement.

18. The non-transitory computer usable medium of claim 16, wherein the tolerance value is specified relative to a measurement of the first cell data structure and the second data structure.

19. The non-transitory computer usable medium of claim 16, the operations further comprising:
    generating a structured visual representation of the structured data format; presenting the structured visual representation to a user; and
    prompting the user to indicate whether the structured visual representation adequately conforms with the visual representation.

20. The non-transitory computer usable medium of claim 19, the operations further comprising:
    generating a structured visual representation of the structured data format; presenting the structured visual representation to a user;
    prompting the user to indicate whether the structured visual representation adequately conforms with the visual representation; and
    if the user indicates that the visual representation does not adequately conform, then receiving a new tolerance value from the user; and
    repeating the steps of determining, the second cell data structure is a neighbor, assembling data from the first and the second cell data structures into the structured data format, generating the structured visual representation, presenting the structured visual representation, and prompting the user.

21. The non-transitory computer usable medium of claim 12, the operations further comprising:
   splitting the first cell data structure into multiple cells containing the same data as the first cell data structure, wherein the first cell data structure is split if it occupies more than one column or row.

22. The non-transitory computer usable medium of claim 12, the operations further comprising:
   creating one or more filler cell data structures.

23. A system comprising:
   a memory configured to store:
      a first module configured to identify, within a visual representation of data, a first cell data structure and a second cell data structure;
      a second module configured to determine, within the visual representation, that the second cell data structure is a neighbor of the first cell data structure based on a distance between the first cell data structure and the second cell data structure being within a tolerance level, wherein determining that the second cell data structure is a neighbor of the first cell data structure indicates a structural relationship between the first and the second cell data structures; and
      a third module configured to assemble data from the first and the second cell data structures into a structured data format that tracks the structural relationship, wherein the structural relationship is available to a data processing algorithm, and wherein the structured data format comprises a notation within the first cell data structure, the notation indicating the second cell data structure is the determined neighbor; and
   one or more processors configured to process the modules.

\* \* \* \* \*